L. CHEVROLET.
INTERNAL COMBUSTION ENGINE.
APPLICATION FILED APR. 23, 1917.

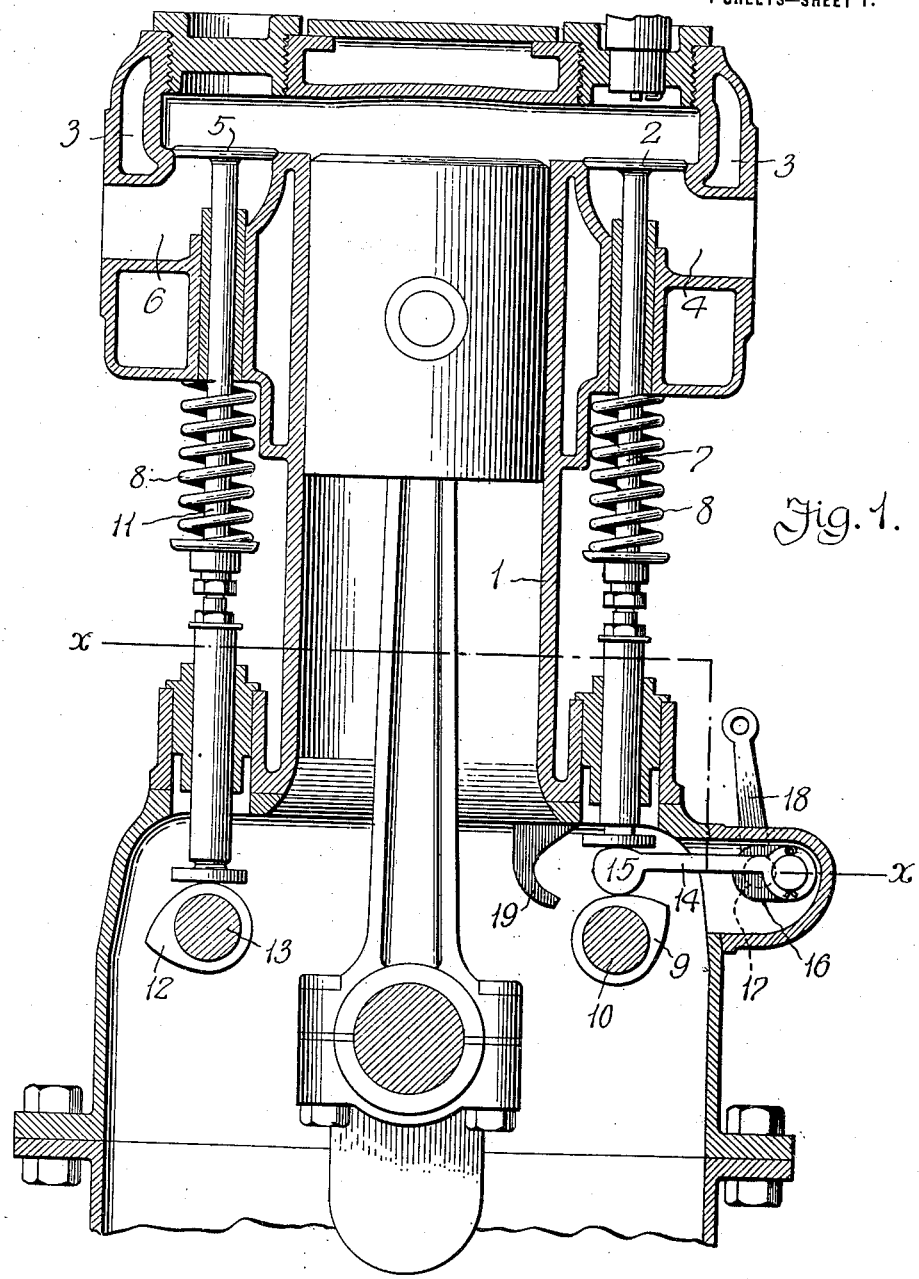

1,318,542.

Patented Oct. 14, 1919.
4 SHEETS—SHEET 2.

Witness
Chas. W. Stauffiger
Karl H. Butler

Inventor
Louis Chevrolet,
By
Attorneys

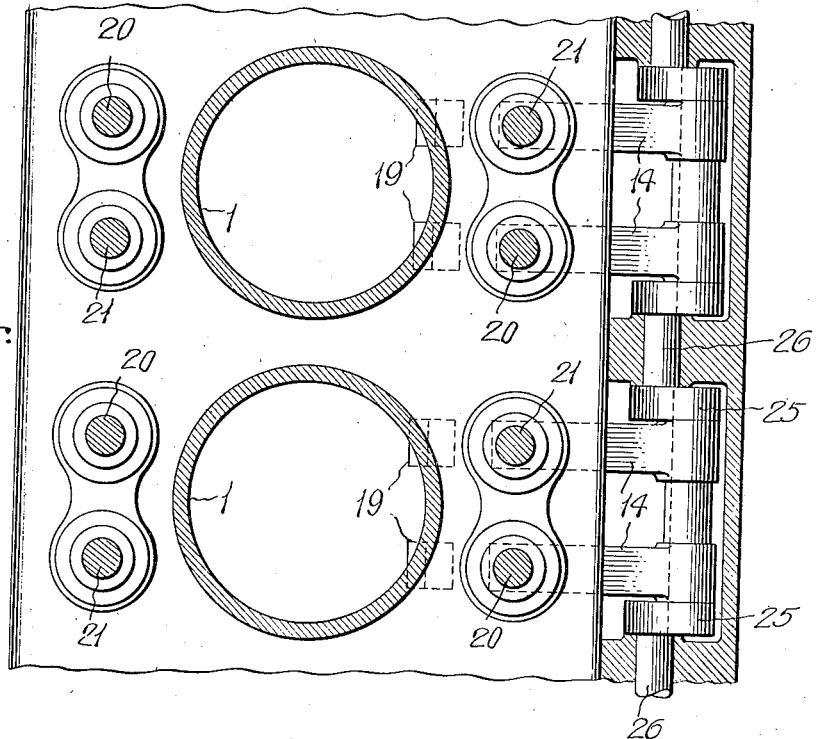
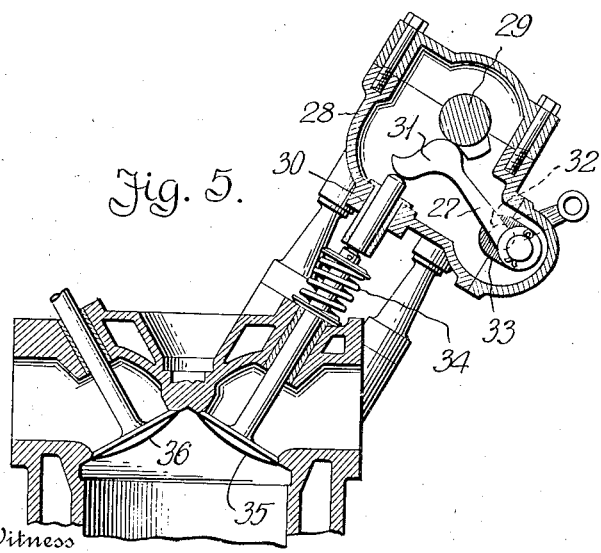
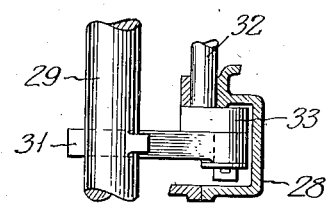

L. CHEVROLET.
INTERNAL COMBUSTION ENGINE.
APPLICATION FILED APR. 23, 1917.

1,318,542.

Patented Oct. 14, 1919.
4 SHEETS—SHEET 4.

UNITED STATES PATENT OFFICE.

LOUIS CHEVROLET, OF PLAINFIELD, NEW JERSEY.

INTERNAL-COMBUSTION ENGINE.

1,318,542.  Specification of Letters Patent.  Patented Oct. 14, 1919.

Application filed April 23, 1917. Serial No. 163,857.

*To all whom it may concern:*

Be it known that I, LOUIS CHEVROLET, a citizen of the United States of America, residing at Plainfield, in the county of Union and State of New Jersey, have invented certain new and useful Improvements in Internal-Combustion Engines, of which the following is a specification, reference being had therein to the accompanying drawings.

In the construction of internal combustion engines it has been found that where cylinders of comparatively large capacity are employed, it is necessary to use valves of large area in order that full charges will be admitted at high engine speeds and a free exhaust secured. With the increase in valve area, trouble is experienced in that the valves are liable to warp and it is difficult to make them seat perfectly under conditions of use. To overcome this defect it is becoming the practice to multiply the number of valves for each cylinder, using four valves of small area instead of two, but under these conditions, it is found that where the full efficiency of the motor is not needed, fuel consumption is very high and that throttling down when running light is difficult on account of the large diameter of the inlet manifold which cuts down the velocity of ingoing charges, resulting in condensation and poor mixture with consequent fuel consumption which is too high and out of proportion to power generated.

It is an object of this invention to obviate these objectionable features of the multi-valve type of engine, and the invention consists in providing separate means for supporting fuel to separate passages controlled by the separate inlet valves, and in providing means for effecting a discontinuance of the feeding of fuel to the combustion chamber past certain of said inlet valves of each cylinder when high power or speed is not required. The invention further consists in providing a simple and efficient construction and arrangement of parts, and in the other matters hereinafter more fully described, reference being had to the accompanying drawings in which—

Figure 1 is a transverse vertical section through a motor illustrative of the invention;

Fig. 4 is a similar view showing a further modified form;

Fig. 5 is a sectional detail illustrating an application of the invention to a motor of the overhead valve type;

Fig. 6 is a detail showing the throwout mechanism for the same;

For the purpose of illustration the invention is shown as applied to a multi-cylinder engine of the T-head type and also to a motor having overhead valves, but it will be understood that the same may be applied to other types of engines and to engines having a different construction and arrangement of cylinders or valves, and the invention is not limited in its scope to the form or arrangement of means for rendering a valve or valves inoperative, except as specifically set forth in the appended claims.

Figure 2:
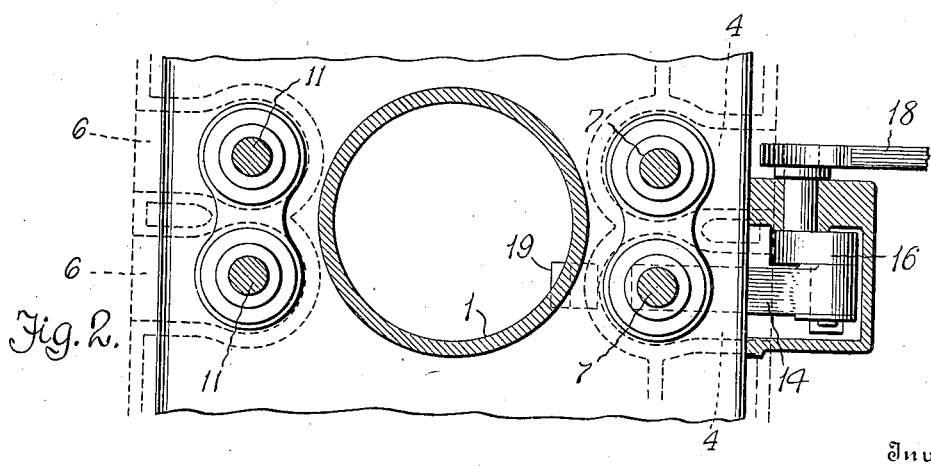
Fig. 2 is a horizontal section through the same substantially upon the line X—X of Fig. 1.

As shown in Figs. 1 and 2 of the drawings, 1 indicates a cylinder of an internal combustion engine, 2 a pair of inlet valves located at one side of the cylinder within the T-head 3 thereof for controlling two separate inlet passages 4 therein, and 5 indicates a pair of exhaust valves located at the opposite side of the cylinder for controlling exhaust passages 6 in that side of the head. The inlet valves 2 have downwardly extending stems 7 of any suitable construction, provided with springs 8 for normally holding the valves seated, and these stems are operated, in opposition to said springs to lift the valves from their seats, by means of cams 9 on a cam shaft 10 located in the crank case of the engine and driven in timed relation to the rotation of the engine shaft in any suitable and well-known manner, not shown. In a like manner the exhaust valves 5 are lifted from their seats against the action of springs 8 on their stems 11 similar to the springs for the inlet valves, by cams 12 on a cam shaft 13 which is also driven in the usual manner, not shown.

Interposed between the cam 9 and the tappet or lower end of the stem 7 of one of the inlet valves 2, is a pivoted tappet member 14 having a head 15 provided with rounded surfaces to be engaged at the upper side by the tappet and at the lower side by the cam. The member or arm 14 is pivoted at its outer end upon a crank portion 16 of a shaft 17 which may be turned by any suitable means, such as a lever 18. By turning the shaft 17, the arm 14 may be moved endwise to disengage its head from between the tappet and cam so that the cam may turn freely without operating the tappet and lifting the valve. A suitable support 19 is provided for the inner end of the arm 14 to receive its head and hold the arm against falling into contact with the cam.

One of the pair of intake valves for the cylinder may thus be rendered inoperative at the will of the driver by simply turning the shaft 17 by means of suitable mechanism (not shown) which may be extended into proximity with the driver's seat if desired when the engine is installed in an automobile, and thus the volume of combustible charges admitted to the cylinder may be reduced when the engine is running light by cutting off one source of supply through one of the inlet passages and a saving in fuel is effected while the engine will continue to operate effectually, and may be run at low speed. When the tappet arm is thrown to inoperative position as described, the spring 8 holds the valve to its seat and thus prevents the passage of gas into the cylinder past this valve and also the escape of exhaust gases past the same.

Figure 3:
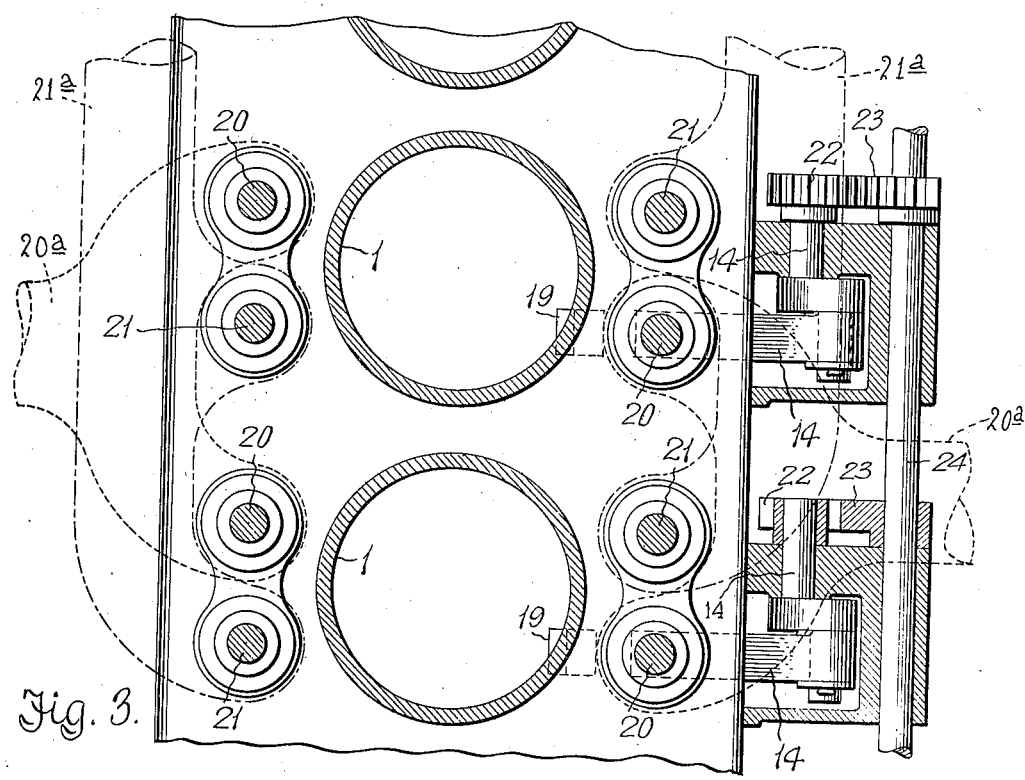
Fig. 3 is a similar horizontal section showing a multi-cylinder engine and illustrating a slight modification in construction.

As illustrated in Fig. 3, in a multi-cylinder engine, each cylinder may be provided with an inlet valve and an exhaust valve at each side, the inlet valves controlling a common inlet passage 20ª at that side and the exhaust valves, a common exhaust passage 21ª at the same side. The stems of said valves are indicated by the numerals 20 and 21 respectively, and the inlet valve of each pair of valves at one side of the cylinders may be simultaneously rendered inoperative by providing a tappet member 14 as previously described for each valve to be rendered inoperative. To simultaneously operate all of the shafts 17 to turn their cranks 16 and move the members 14, each shaft may be provided with a gear 22 on its outer end to be engaged by gear segments 23 secured upon a single operating shaft 24 extending the length of the engine and mounted in suitable bearings on the crank case. This shaft 24 may be operated in any suitable manner to turn the same and throw all of the tappet members 14, thus rendering all of the inlet valves at one side of the engine inoperative and closing the fuel inlet passage 20ª at that side, so that combustible charges will be admitted only through the one inlet passage at the other side of the cylinders. In a like manner, if found desirable, the mechanism may be duplicated at the opposite side of the engine for rendering all of the exhaust valves 21 at that side inoperative, thus cutting out all of the inlet valves 20 at one side and all of the exhaust valves at the opposite side and leaving a single inlet valve at one side of each cylinder and a single exhaust valve at the other side of each cylinder in operation. As illustrated in Fig. 3, the cut-out mechanism will operate to render the inlet valves at one side only, of the engine inoperative, thus leaving the exhaust valves at both sides operative while fuel is supplied to the operative valve from a single source at one side only.

In Fig. 4 a similar arrangement of valves is shown as in Fig. 3, that is, an exhaust valve and an inlet valve are provided for each cylinder at each side of the engine. The cut out mechanism shown in this figure is arranged to render inoperative all of the valves, both inlet and exhaust, at one side of the engine, a tappet member 14 being provided for each valve, and all of these members are attached to the cranks 25 of a single shaft 26 extending the full length of the engine and operated in any suitable manner (not shown).

Fig. 5 illustrates a motor construction wherein the valves have upwardly extending stems, it being understood that each cylinder is provided with a plurality of inlet and a plurality of exhaust valves which may be arranged in any suitable manner and cut-out mechanism provided to render any desired number of said valve inoperative. This cut-out mechanism consists of a tappet member 27 located within a housing 28 for the overhead cam shaft 29 and upper end of the tappet 30, the enlarged end or head 31 of said member being interposed between said tappet and the cam on said shaft. The opposite end of each member 27 for each valve which is to be rendered inoperative, is pivotally connected to a shaft 32 by a crank arm 33 on the shaft, said shaft being mounted in bearings on an extension of the casing 28. By turning the shaft 32, its crank will move the tappet member 27 longitudinally and disengage the head 31 thereof from the cam and tappet, thus permitting the cam to turn without depressing the tappet and the spring 34 to hold the valve 35 closed. The other inlet valve 36 which may be located at the opposite side of the head as shown, will continue to operate to admit explosive charges to the cylinder.

Figure 7:
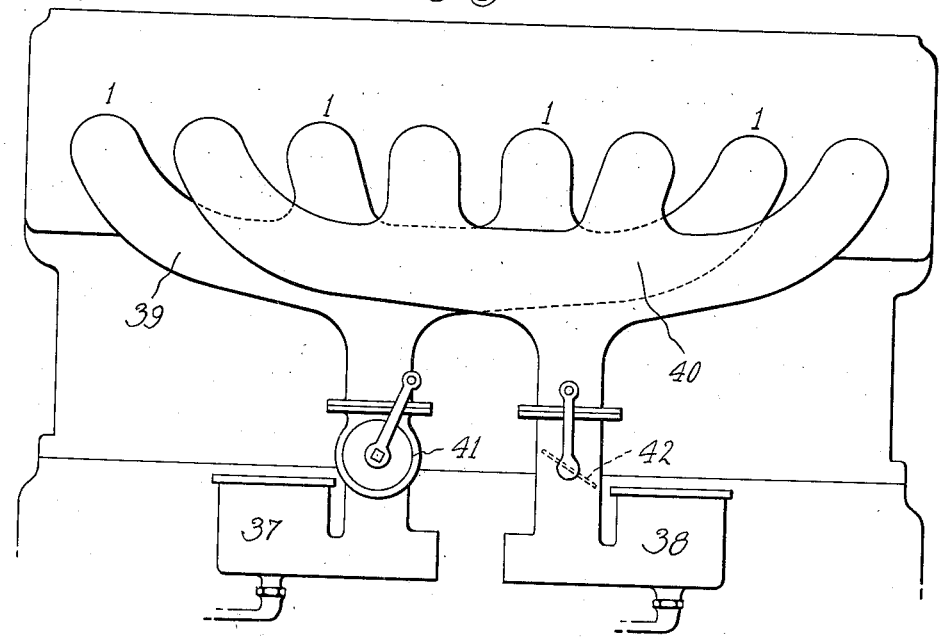
Fig. 7 is a diagrammatic side elevation of the type of engine shown in Fig. 1 and illustrating the application thereto of separate feed supplies for each cylinder.
Figure 8:
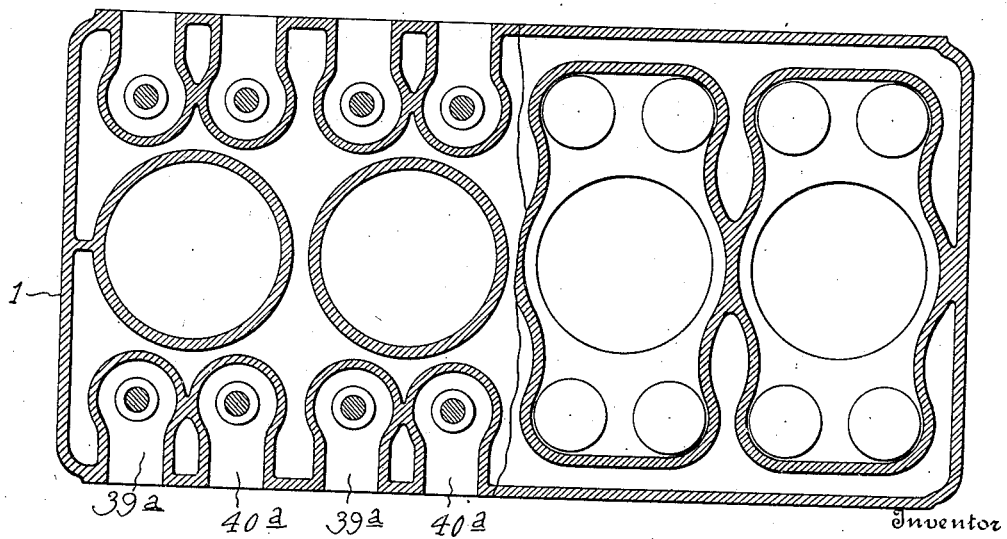
Fig. 8 is a sectional diagrammatic view illustrating the arrangement of ports and passages.

In Fig. 7 separate carbureters 37 and 38 and separate intake manifolds 39 and 40 are illustrated for separately supplying fuel charges to the separate inlet passages 39ª and 40ª, shown in Fig. 8. The carbureter 37 is shown as being provided with a tight closing throttle valve 41 and the carbureter 38, as provided with the usual butterfly throttle 42. By closing the valve 41, the supply of combustible charges to one of the inlet valves of each cylinder is effectually cut off and thus the volume of charges for each cylinder may be reduced without the necessity for rendering one of the inlet valves of each cylinder inoperative, said valves being continuously operated by their cams but as the supply of fuel thereto is cut off no charges are admitted thereby.

By providing two or more separate inlet passages for each cylinder, and a separate fuel supply and a separate inlet valve for each passage, together with means for preventing fuel charges from entering the cylinder past one or more of the inlet valves for each cylinder, a saving of fuel is effected when high power or speed is not required, and the setting of one set of inlet valves for low speed, good idling, quick pickup and acceleration and another set for high power and speed, is permitted.

Where a single fuel supply for double inlet valves or valves of large area is used, throttling of the engine for low speed or idling is impractical and difficult due to the necessarily large diameter of the inlet manifold which results in low gas velocity, giving an uneven mixture and poor carburetion, and also a fuel consumption which is entirely too high in proportion to power generated and mileage covered. By providing two or more separate sources of fuel supply for each cylinder, the necessary gas velocity is secured through one of such sources to maintain proper carburetion at low speeds, as the manifolds may be properly proportioned, and when all supplies are open, the necessary volume and proper mixture is supplied to give the desired high power and speed.

By cutting off the fuel supply which may be properly set for high power and speed, and drawing only from that supply which is properly set for low speed, quick acceleration, and fuel economy, a very great fuel saving is effected and the engine is made adaptable for use upon motor vehicles traversing city streets where traffic is congested, as well as upon cars designed for speed and power.

Obviously this invention may be applied to any of the several known types of engines and the cutting off of one or more sources of fuel supply for each cylinder may be effected in various ways. I do not therefore limit myself to the particular type of means shown.

What I claim is:—

1. In an internal combustion engine, the combination with a cylinder, of means at each side of said cylinder for admitting charges thereto and exhausting gases therefrom, and means for rendering inoperative said admitting and exhausting means at one side of said cylinder.

2. In an internal combustion engine, the combination with a plurality of cylinders, of a plurality of inlet and exhaust valves for each of said cylinders arranged with an inlet and an exhaust valve at each side of each cylinder, and means for rendering inoperative all of the valves at one side of the cylinders.

3. In an internal combustion engine, the combination with a cylinder, of means at each side of said cylinder for admitting charges thereto, and exhausting gas therefrom, and single manually operable means for simultaneously rendering inoperative said admitting and exhausting means at one side of said cylinder.

4. In an internal combustion engine, the combination with a plurality of cylinders, of a plurality of inlet and exhaust valves for each of said cylinders arranged with an inlet and an exhaust valve at each side of each cylinder, and a single manually operable means for simultaneously rendering inoperative all of said valves at one side of said cylinders.

In testimony whereof I affix my signature in the presence of two witnesses.

LOUIS CHEVROLET.

Witnesses:
 LEWIS E. FLANDERS,
 ANNA M. DORR.